(12) United States Patent
Ito et al.

(10) Patent No.: US 12,050,948 B2
(45) Date of Patent: Jul. 30, 2024

(54) NON-TRANSITORY MEDIUM STORING PROGRAM EXECUTABLE BY COMPUTER OF INFORMATION PROCESSING APPARATUS AND INFORMATION PROCESSING APPARATUS

(71) Applicant: BROTHER KOGYO KABUSHIKI KAISHA, Nagoya (JP)

(72) Inventors: Fuyuko Ito, Nagoya (JP); Jun Komura, Nagoya (JP); Kazuhiko Kondo, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/475,815

(22) Filed: Sep. 27, 2023

(65) Prior Publication Data

US 2024/0111978 A1    Apr. 4, 2024

(30) Foreign Application Priority Data

Sep. 29, 2022  (JP) .................. 2022-155965

(51) Int. Cl.
*G06K 15/02* (2006.01)
*G06K 15/00* (2006.01)

(52) U.S. Cl.
CPC ..... *G06K 15/1807* (2013.01); *G06K 15/1802* (2013.01); *G06K 15/1809* (2013.01); *G06K 15/403* (2013.01); *G06K 2215/0097* (2013.01)

(58) Field of Classification Search
CPC ............. G06K 15/024; G06K 15/1801; G06K 15/1802; G06K 15/1803; G06K 15/1806; G06K 15/1807; G06K 15/1809; G06K 2215/0097; G06F 3/1242; G06F 3/1243
USPC ............................ 358/1.11, 1.13, 1.15, 1.18
See application file for complete search history.

(56) References Cited

U.S. PATENT DOCUMENTS

2014/0307273 A1   10/2014 Kajihara et al.
2020/0094578 A1*  3/2020 Hirabayashi .......... G06F 3/1284

FOREIGN PATENT DOCUMENTS

JP    2006-268388 A    10/2006
JP    2014-206859 A    10/2014

* cited by examiner

*Primary Examiner* — Kent Yip
(74) *Attorney, Agent, or Firm* — KENEALY VAIDYA LLP (57) ABSTRACT

A non-transitory medium storing a program executable by a computer of an information processing apparatus, the program, when executed by the computer, causing the computer to execute: a designating process for designating a database file including a plurality of text data; an associating process for associating the database file designated in the designating process with a text object; and a specific printing process for generating label data, for each of the text data included in the database file, with each of the text data written in the text object, and for causing a label printer to execute printing based on the label data generated.

13 Claims, 10 Drawing Sheets

NON-TRANSITORY MEDIUM STORING PROGRAM EXECUTABLE BY COMPUTER OF INFORMATION PROCESSING APPARATUS AND INFORMATION PROCESSING APPARATUS

REFERENCE TO RELATED APPLICATIONS

This application claims priority from Japanese Patent Application No. 2022-155965 filed on Sep. 29, 2022. The entire content of the priority application is incorporated herein by reference.

BACKGROUND ART

Conventionally, a function called "database printing" is known as a technique for a program to edit data to be printed by a label printer. In the database printing, a database file is designated and the database file is associated with text objects. Then, when a print instruction is received, label data is generated for each text data in the database file, with the text data written to one of the text objects, and printing based on the generated label data is executed by the label printer.

DESCRIPTION

Sometimes, paired labels in which the order of two strings of characters is swapped based on a specific character (e.g., "/"), such as "ABC/XYZ" and "XYZ/ABC" are needed. When creating such a pair of labels by using database printing, text data corresponding to each string is required, but the database file may only contain text data for one of the pair, such as "ABC/XYZ" only. In such a case, the user may not be able to obtain the desired pair of labels.

According to an aspect of the present teaching, there is provided a non-transitory medium storing a program executable by a computer of an information processing apparatus, the program, when executed by the computer, causing the computer to execute: a designating process for designating a database file including a plurality of text data; an associating process for associating the database file designated in the designating process with a text object; and a specific printing process for generating label data, for each of the text data included in the database file, with each of the text data written in the text object, and for causing a label printer to execute printing based on the label data generated, wherein based on a first operation, the program further causes the computer to execute: a duplicating process for duplicating first text data included in the database file to generate second text data; and an exchanging process, with respect to the second text data consisting of: a specific character; a first character string before the specific character; and a second character string after the specific character, for exchanging the first character string and the second character string each other, and wherein in a case that the second text data is generated in the duplicating process, the program further causes the computer, for each of the text data included in a text data group consisting of the first text data and the second text data, to generate the label data with the text data written in the text object and to cause the label printer to execute the printing based on the label data generated, in the specific printing process.

According to the program stored in the non-transitory medium, based on the first operation, the second text data is generated from the first text data included in the database file, and if the second text data contains a specific character in the middle, the character strings before and after the specific character are exchanged each other. In the specific printing process, the program causes the label printer to execute printing based on each text data by using the text data group consisting of the first text data and the second text data based on the first text data. This results in an output of a pair of labels from the single first text data, the pair of labels including: a label of the first text data; and another label of the second text data in which the character strings included in the first text data are exchanged each other. Thus, even if only one text data of the pair is provided, the pair of labels can be obtained.

An information processing apparatus that executes the above program, a control method for realizing the functions of the program, and a computer-readable storage medium that stores the program are also new and useful.

According to the technology disclosed herein, a program that can support database printing and improve the convenience of database printing is realized.

The following is a detailed description of the embodiment of the program with reference to the accompanying drawings. This specification discloses a program to be executed on a mobile terminal that can be connected to a label printer.

Figure 1:
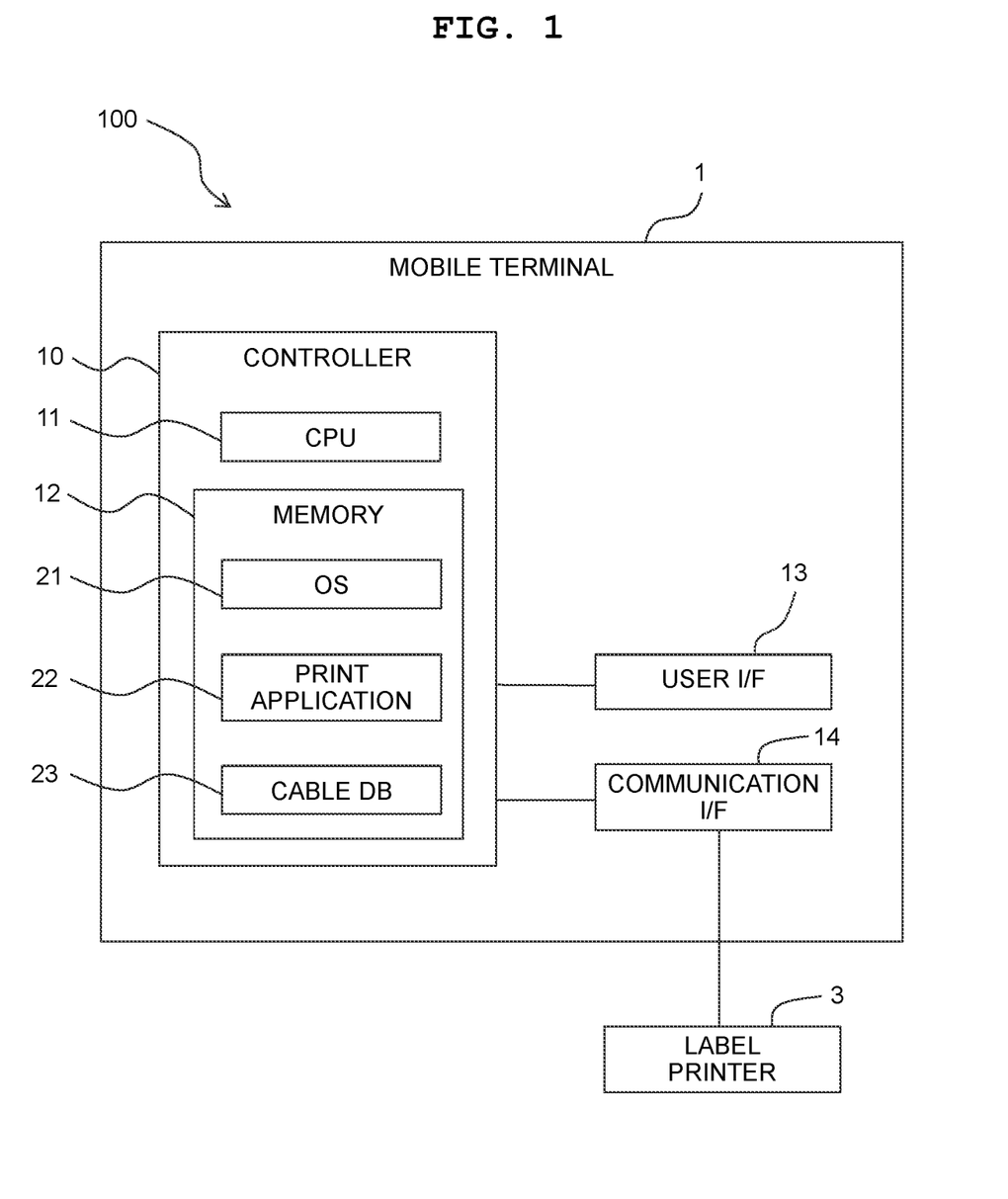
FIG. 1 is a schematic diagram of a printing system.

The mobile terminal 1 included in the printing system 100 of this embodiment has a controller 10 including a CPU 11 and a memory 12, as depicted in FIG. 1. The mobile terminal 1 is an example of an information processing apparatus. The CPU 11 is an example of a computer. The mobile terminal 1 also has a user interface (hereinafter referred to as "user IF") 13 and a communication interface (hereinafter referred to as "communication IF") 14, which are electrically connected to the controller 10. Note that the controller 10 in FIG. 1 is a collective term for the hardware and software used to control the mobile terminal 1, and does not necessarily represent a single piece of hardware actually present in the mobile terminal 1. The information processing apparatus is not limited to the mobile terminal, but may also be a personal computer.

The CPU 11 executes various processes according to programs read from the memory 12 or based on user operations. The memory 12 stores various programs and various data. The memory 12 is also used as a work area when various processes are executed, and a buffer provided in the CPU 11 is an example of the memory 12. An example of the memory 12 is not limited to the ROM, RAM, HDD, etc. built in the mobile terminal 1, but can also be a storage medium that is readable and writable by the CPU 11, such as CD-ROM, DVD-ROM, etc.

The user IF 13 includes hardware that displays a screen to inform information to the user and hardware that accepts operations by the user. The user IF 13 of the mobile terminal 1 includes a touch panel with a display function and an input receiving function. The user IF 13 may be a combination of a display capable of displaying information and hardware keys with input reception functions.

The communication IF 14 includes hardware for communicating with an external apparatus such as a label printer 3. Communication standards for the communication IF 14 include Ethernet (registered trademark), Wi-Fi (registered trademark), USB, etc. The mobile terminal 1 may be equipped with multiple communication IFs 14 that support multiple communication standards.

The memory 12 of the mobile terminal 1 stores an operating system (hereinafter referred to as "OS") 21, a printing application program (hereinafter referred to as "print application") 22, and a database for cables (hereinafter referred to as "cable DB") 23. The OS 21 is, for example, iOS (registered trademark), Android (registered trademark), Windows (registered trademark), macOS (registered trademark), and Linux (registered trademark).

The print application 22 is a program that, for example, accepts user instructions via the user IF 13 and, based on the received instructions, edits images to be printed and sends print instructions to the label printer 3. The print application 22 is an example of a program. The cable DB 23 is a database in which cable information is stored. The cable DB 23 is a file created by the user and is not stored in the memory 12 when the mobile terminal 1 is shipped from a factory. The cable DB 23 is an example of a database file. Details of the print application 22 and the cable DB 23 are described below.

The label printer 3 in this embodiment has at least a printing function and a communication function. The printing method of the label printer 3 is, for example, thermal transfer, inkjet, or electrophotographic. When the label printer 3 receives printing instructions and label data to be printed from an external apparatus such as the mobile terminal 1 via the communication function, the label printer 3 executes printing based on the label data to create a label.

The label printer 3, for example, can accommodate a rolled label paper and has the capability to print images on the label paper to create labels. The rolled label paper is a print medium in which label paper is superimposed on a continuous strip of release paper and rolled up. The label paper may be a continuous long tape or a die cut label that has been pre-cut into a predetermined shape. The label printer 3 of this embodiment has a function to cut and discharge the pre-printed portion after printing.

The procedure for creating cable labels to be attached to cables is then described with reference to the sequence diagram in FIG. 2. The procedures and processing steps of each program described below basically represent processing of the CPU 11 according to the instructions described in each program. In other words, "determine", "decide", "obtain", "accept" and other processes in the following description represent processing by the CPU 11. The processing by the CPU 11 also includes hardware control using an API of the OS 21. In this specification, the description of the OS 21 is omitted to describe the operation of each program. In addition, "obtain" is used in a concept that does not require a request.

The print application 22 of this embodiment is capable of performing database printing based on a database file containing text data. In the database printing, the print application 22 accepts designation of a database including text data to be printed, text objects to be arranged in the label data, and an instruction to associate the designated database with the text objects.

When the print application 22 receives an instruction to execute the database printing, the print application 22 creates the label data in which text data contained in the designated database is written into each of the arranged text objects, and causes the label printer 3 to execute printing based on the created label data. The printing application 22 creates label data in which each text data contained in the database is written in one of the text objects for each text data contained in the database in turn and passes the label data to the label printer 3, thereby causing multiple labels printed with each text data in the database to be created.

This specification describes the procedure for creating cable labels by using the database printing. Cable labels are attached, for example, near both ends of a cable to distinguish multiple cables used for wiring. The cable label to be created in the procedure described herein is, for example, a label on which information indicating one end to be attached and information indicating the other end are printed on a single sheet for each cable.

Figure 2:
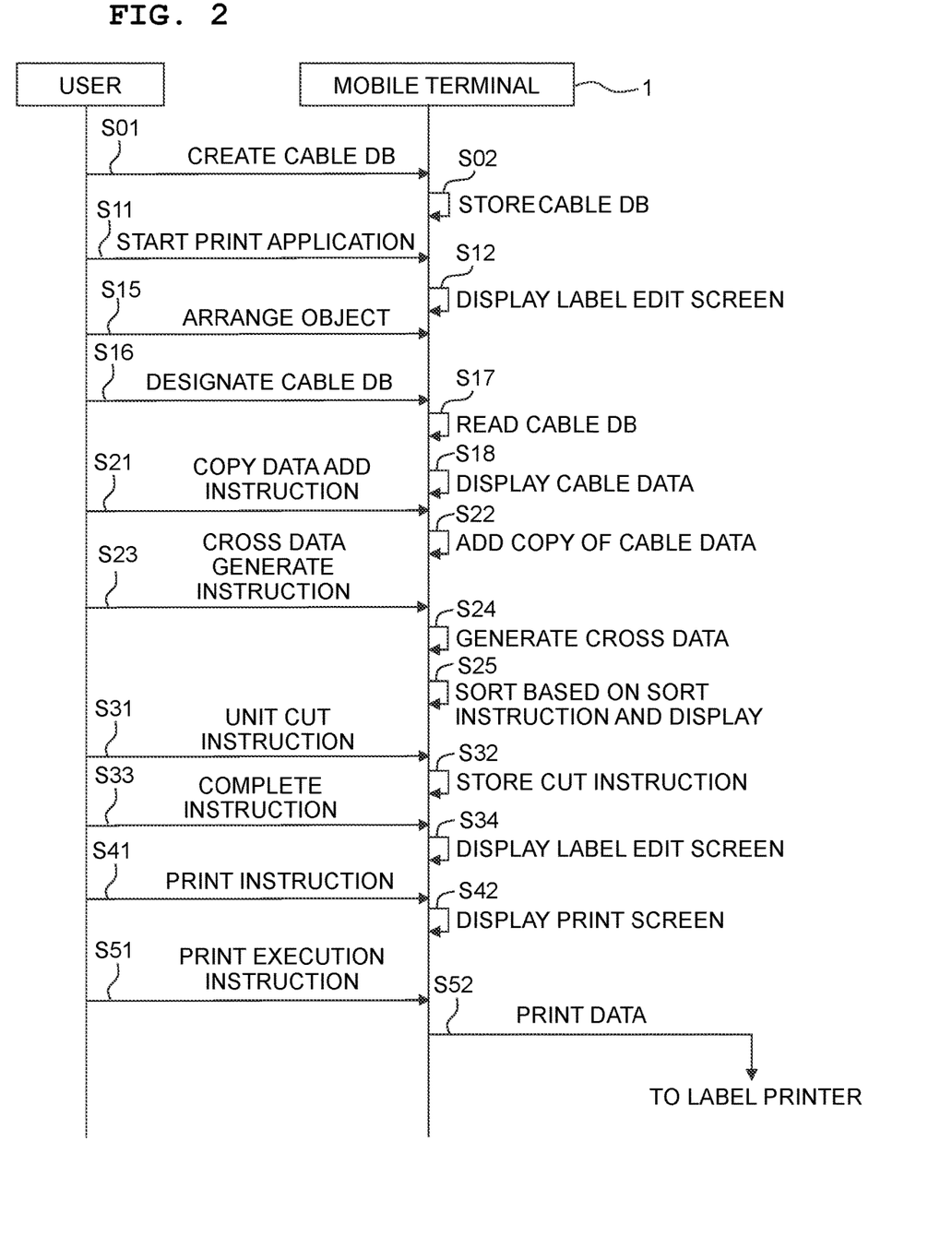
FIG. 2 is a sequence diagram of a label creation procedure.
Figure 3:
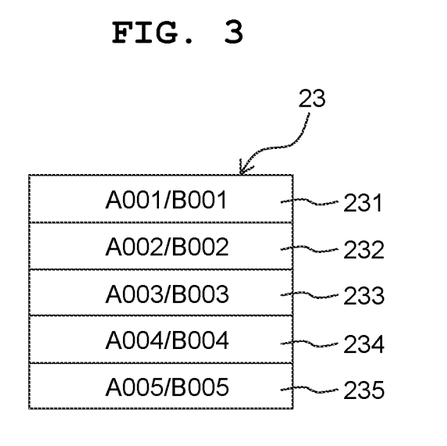
FIG. 3 depicts an example of a cable DB.

As depicted in FIG. 2, a user who wishes to create a cable label creates a cable DB 23 for storing data to be printed (S01), and stores the cable DB 23 in the mobile terminal 1 (S02). The cable DB 23 in this embodiment includes, for example, a plurality of cable data 231, 232, etc. described in the same format, as depicted in FIG. 3. Each cable data 231, 232, etc. is data indicating one cable and is, for example, a string consisting of two character strings depicting both ends of each cable and a delimiter disposed therebetween to separate the two character strings. The delimiter is, for example, "/" and is determined beforehand in the print application 22. The user determines the cable data for all cables to be printed and creates the cable DB 23.

The cable DB 23 is, for example, a CSV file. The user may create the cable DB 23 using an application program for creating tables or the like, or may create the cable DB 23 as a text file with text indicating the cable data. The print application 22 may support database files in formats other than CSV files. The user may create the cable DB 23 in the mobile terminal 1, or the cable DB 23 may be created by another apparatus and stored in the mobile terminal 1.

Figure 4:
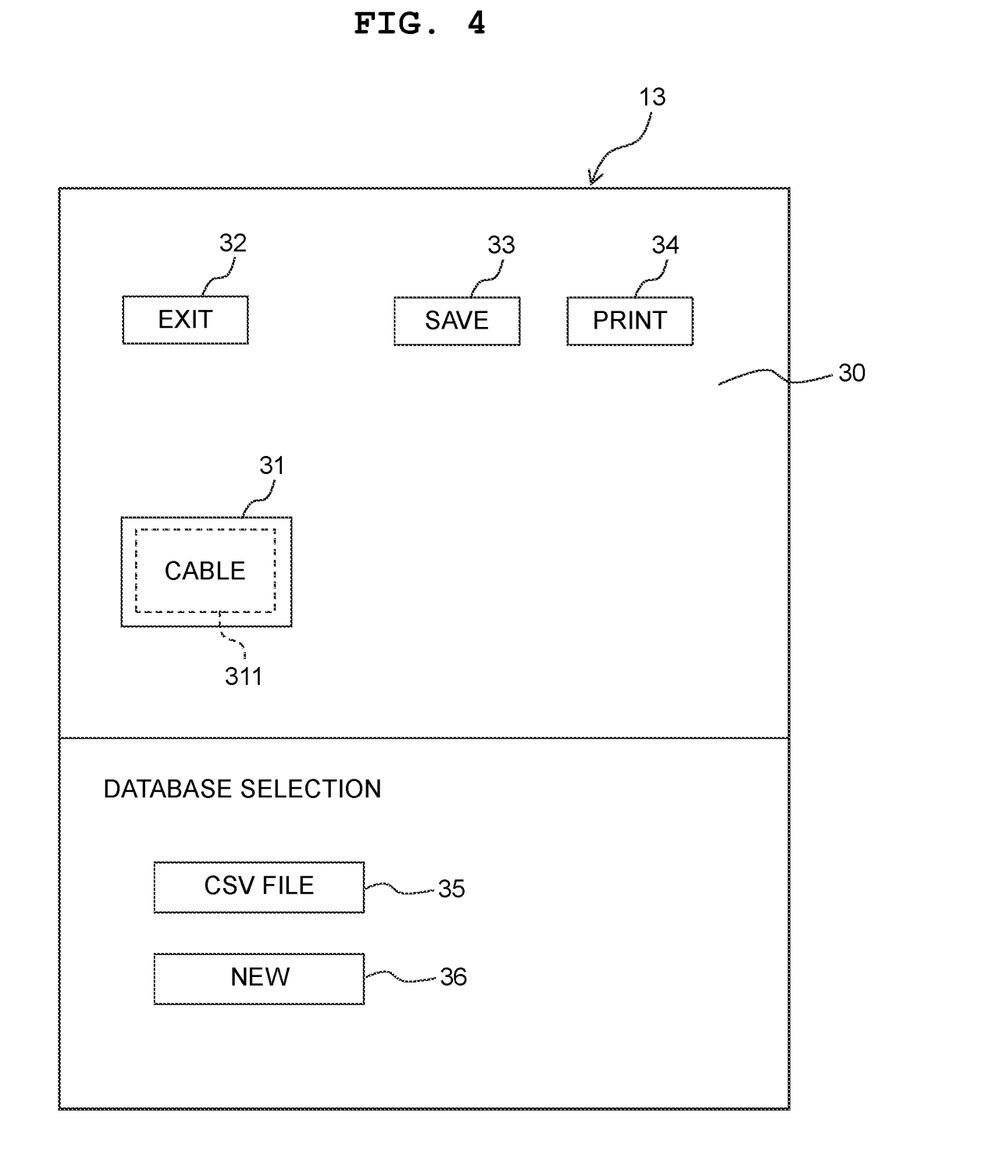
FIG. 4 depicts an example of a label edit screen.

After creating the cable DB 23, the user inputs instructions to start the print application 22 on the mobile terminal 1 (S11). The print application 22, having been started, displays a label edit screen 30 on the user IF 13 that accepts label create instructions, as depicted in FIG. 4, for example (S12). The mobile terminal 1 can then accept user operations on the label edit screen 30 being displayed.

The label edit screen 30 includes, for example, a label area 31 and buttons that accept various instructions, as depicted in FIG. 4. The label area 31 is an area for displaying a print image of a label to be printed. An exit button 32 is provided to accept instructions to exit the print application 22. A save button 33 is provided to accept instructions to save the label data of the label to be printed that is displayed in the label area 31. A print button 34 is provided to accept instructions to execute printing.

The user generates label data for the cable label to be created on the label edit screen 30. In order to generate the label data, the user arranges objects 311 of the label to be created in the label area 31 in the label edit screen 30 (S15). The print application 22 has several types of objects that can be placed in the label area 31, including text, marks, and pictures. The user who wishes to create the cable label arranges the object 311 for the cable label in the label area 31. The object for the cable label is a text object into which text data is written.

The print application 22 may have multiple types of templates to facilitate the creation of various types of labels. If the print application 22 has a template for cable labels, the user selects the template for cable labels, and the print application 22 arranges the object 311 for the cable label in the label area 31.

Once the object 311 for the cable label is arranged in the label area 31, the print application 22 can accept instructions for database printing. The print application 22 displays buttons 35 and 36 for accepting selection of a database to be used for the database printing, as depicted in FIG. 4. The button 35 is provided to accept instructions to select a database to be printed from CSV files stored in the mobile terminal 1. The button 36 accepts instructions to create a new database. The user may operate the button 36 to create the cable DB 23 instead of S01 and S02.

The user selects the button 35 to designate the previously created cable DB 23 from the list of CSV files displayed (S16). S16 is an example of a designating process. The print application 22 reads the cable DB 23 which is designated by the user (S17).

Figure 5:
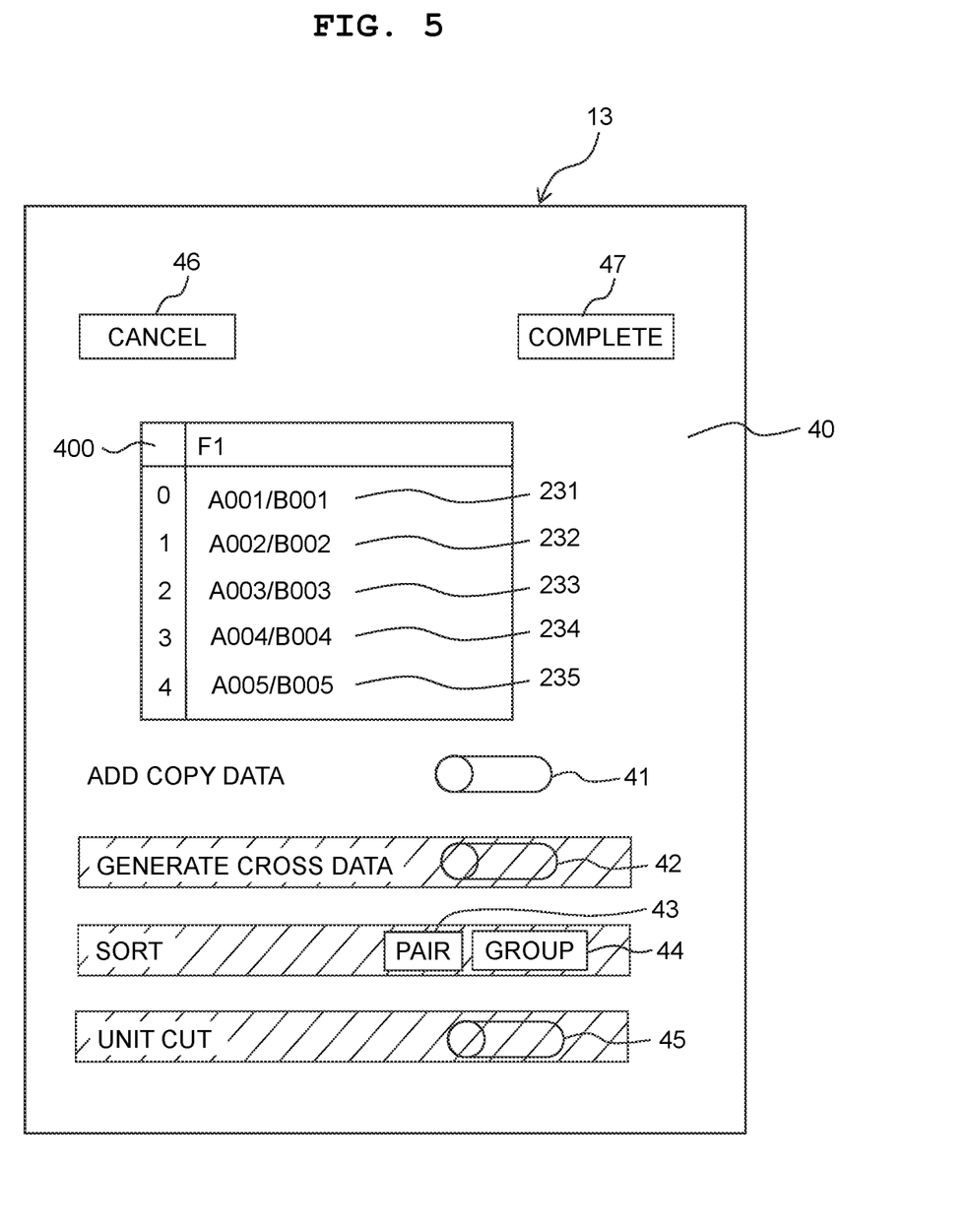
FIG. 5 depicts an example of a database display screen.

When the cable DB 23 is designated, the print application 22 displays a data display screen 40 on the user IF 13, including each cable data in the read cable DB 23, for example, as depicted in FIG. 5 (S18). The data display screen 40 includes a data display part 400 and various buttons for accepting user operations. In the data display part 400, all cable data 231 to 235 (see FIG. 3) contained in the read cable DB 23 are displayed within the displayable range.

A copy data add button 41, a cross data create button 42, and a unit cut button 45 are switches that can be switched on and off by swiping left and right, and are all depicted in the off state in FIG. 5. The cross data create button 42, sort instruction buttons 43 and 44, and the unit cut button 45 become operable when the copy data add button 41 is turned on, and are grayed out and not operable in the off state depicted in FIG. 5.

A cancel button 46 is provided to accept an instruction to cancel the operation accepted on the data display screen 40 and to return to the label edit screen 30. A complete button 47 is provided to accept an instruction to complete the generation of the database with each cable data currently displayed in the data display column 400 as a print target. When the complete button 47 is operated, the print application 22 stores the database generated by the operation accepted on the data display screen 40 and returns to the label edit screen 30.

The copy data add button 41 is provided to accept instructions to create a database that generates and adds copy data, which are duplicates of all the cable data 231 to 235 included in the read cable DB 23. The user swipes the copy data add button 41 to the right in the state depicted in FIG. 5 to turn it on (S21). The operation to turn on the copy data add button 41 is an example of a second operation.

Figure 6:
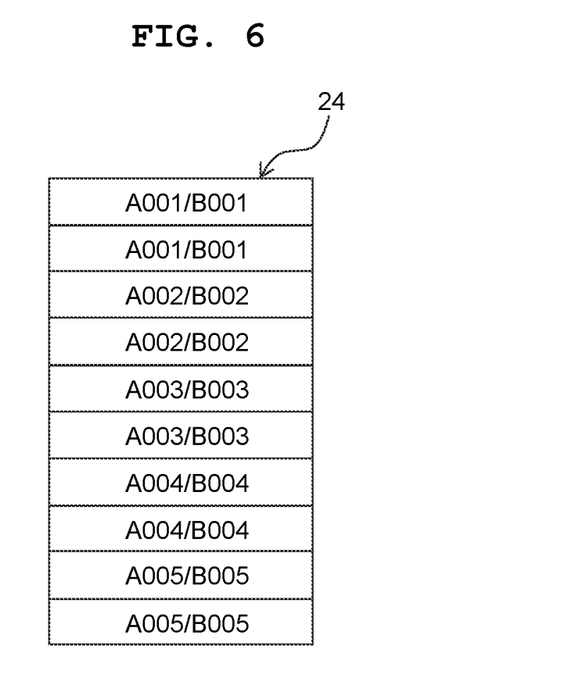
FIG. 6 depicts an example of the cable DB after adding copy.

When the copy data add button 41 is turned on, the print application 22 creates copy data, which is a duplicate of each cable data in the cable DB 23, and adds it to the database (S22). S22 is an example of a duplicating process. Each cable data in the cable DB 23 is an example of a first text data, and the copy data is an example of a second text data. The print application 22 arranges each copy data created, for example, immediately after each cable data, as depicted in FIG. 6.

When the print application 22 receives an instruction to add copy data, the print application 22 may first create a database file of a copy of the cable DB 23 being displayed, and then add the copy data to the database file of the copy. In this case, even if the process is canceled once the copy data is added based on the user's instruction, the print application 22 can easily display the original cable DB 23.

When the copy data add button 41 is turned on, the print application 22 can accept operations to the cross data create button 42. The cross data create button 42 is provided to accept instructions to change each added copy data to cross data. The cross data is data in which the character string before the delimiter included in the target text data and the character string after the delimiter included in the target text data are exchanged each other. For example, if the delimiter is "/", the cross data for "A/B" is "B/A".

When the cross data create button 42 is turned on (S23), the print application 22 creates each cross data by exchanging the character strings of each copy data added in S22 (S24). The delimiter is an example of a specific character, and S24 is an example of an exchanging process. The operation of turning on the cross data create button 42 after the copy data add button 41 is turned on is an example of a first operation.

The delimiter is not limited to "/", but may be any other character, and multiple types of characters may be set. The print application 22 may or may not distinguish between full-width and half-width delimiters. The print application 22 in this embodiment changes the copy data to cross data when the target copy data contains the delimiter in the middle of the copy data, i.e., when the copy data contains text both before and after the delimiter. Note that "in the middle" is not meant the center, but anything other than the beginning and the end.

On the other hand, the print application 22 may leave or delete copy data containing the delimiter at the beginning or at the end without changing them to cross data. The print application 22 may also delete cable data containing the delimiter at the beginning or end from the database, or the database may contain only cable data without copy data or cross data.

After executing S24, the print application 22 sorts the created cross data according to which of the sort instruction buttons 43 and 44 is selected, and lists the cable data and the cross data on the user IF 13 (S25). The sort instruction buttons 43 and 44 are buttons for specifying the sort order of the cable data and the cross data, and allow only one of them to be selected. Immediately after the cross data create button 42 is turned on, the print application 22 makes the sort instruction button 43 selected state.

The print application 22 can accept operations to the sort instruction buttons 43 and 44 when the cross data create button 42 is turned on, and creates different databases according to the user's selection. S25, which sets the order of the cable data and cross data according to which of the sort instruction buttons 43 and 44 is selected, is an example of an order setting process and an example of a sorting process. S25 is an example of a listing process.

Figure 7:
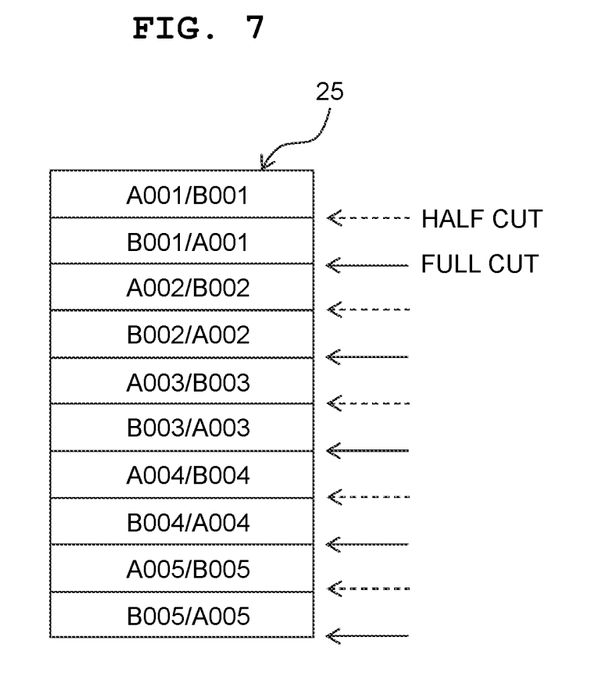
FIG. 7 depicts an example of the cable DB after pair sorting.
Figure 8:
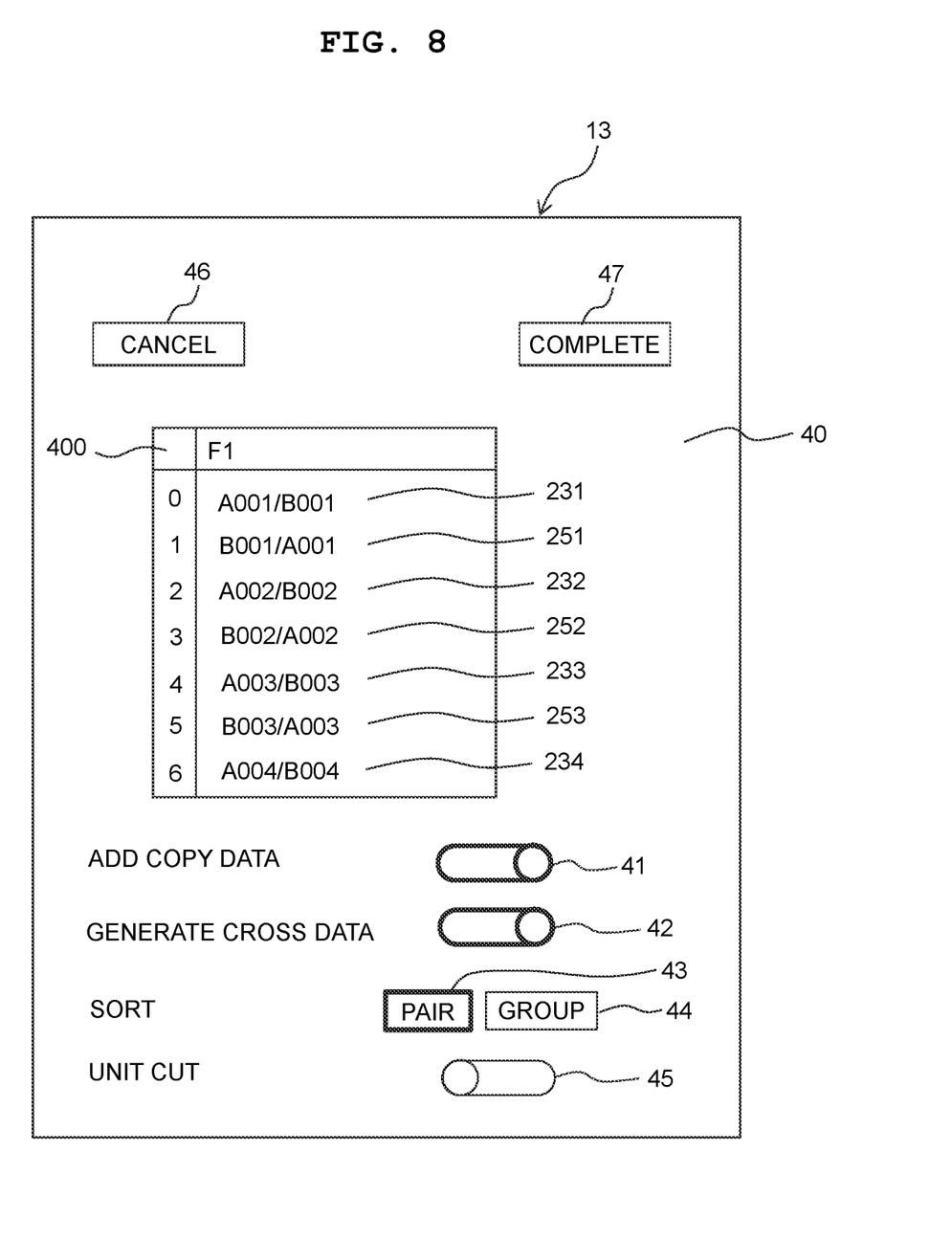
FIG. 8 depicts an example of the database display screen after adding cross data in the pair sorting.

When the sort instruction button 43 for specifying pair sorting is selected, the print application 22 creates a database in which the individual cable data is followed by the cross data corresponding to the cable data, as depicted in FIG. 7. As a result, a database in which the cable data and the cross data are arranged in pairs is displayed in the data display part 400 of the data display screen 40, as depicted in FIG. 8. In the case that the sort instruction button 43 is selected, S25 is an example of a pair sorting process. The pair sorting is an example of a first order.

Figure 9:
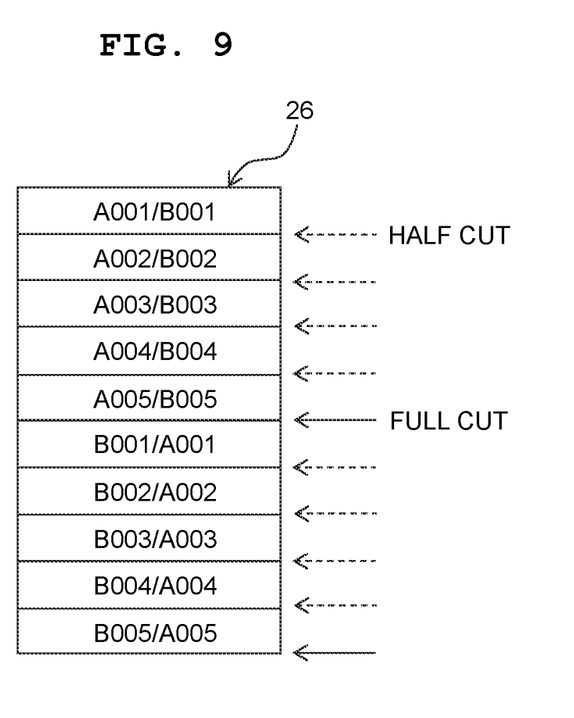
FIG. 9 depicts an example of the cable DB after group sorting.

When the sort instruction button 44 for specifying group sorting is selected, the print application 22 creates a database in which all cable data are aligned and are followed by all cross data, as depicted in FIG. 9. In this case, the print application 22 arranges all the cable data in the order of the original cable DB 23, and then arranges each cross data corresponding to each cable data in the order of the corresponding cable data. By aligning the cross data in the order of the cable data, when labels are created based on this database, labels for the cable data and the cross data are created in the same order, which inhibits label usage errors.

Figure 10:
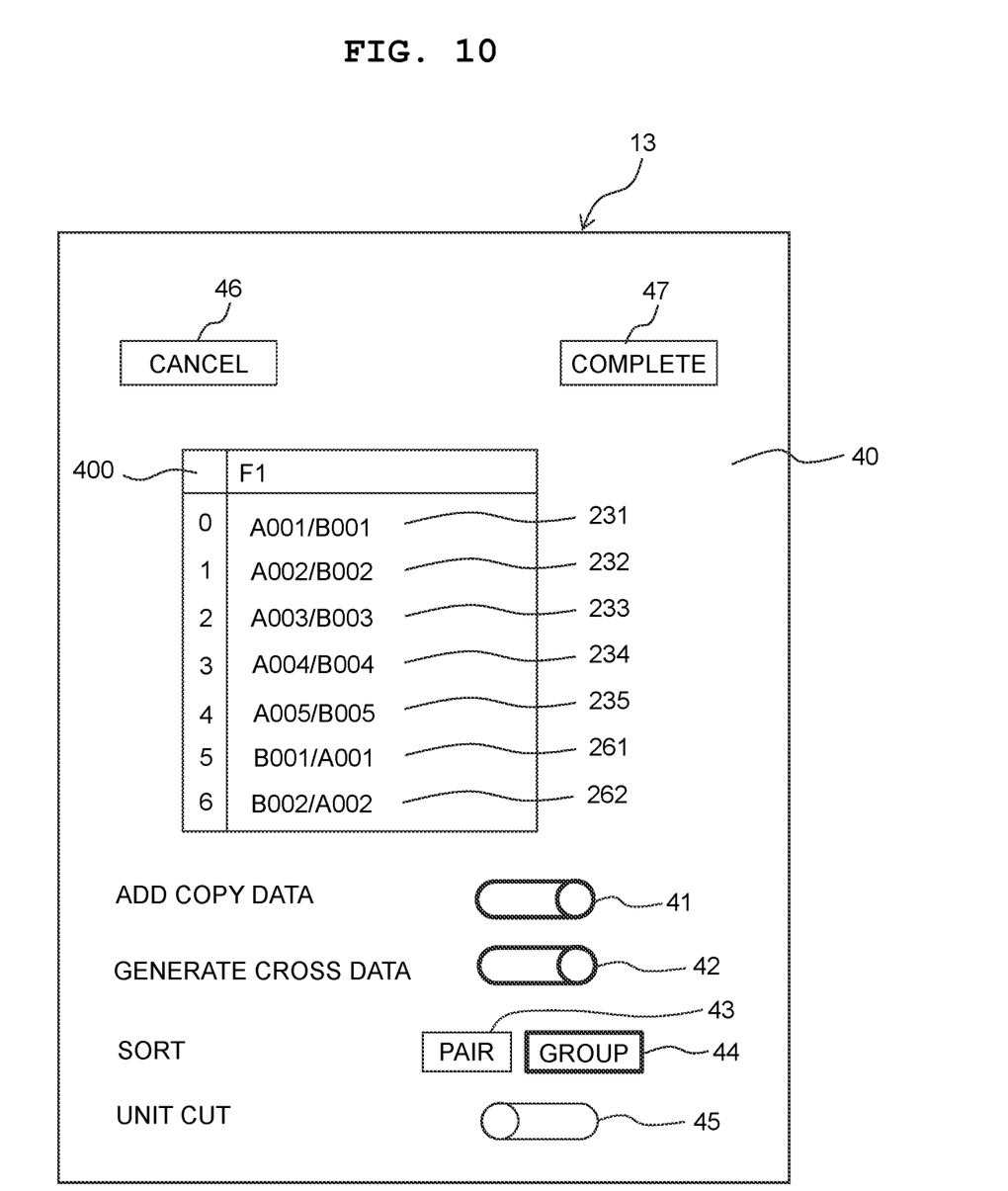
FIG. 10 depicts an example of the database display screen after adding cross data in the group sorting.

As a result, a database with a group of cable data and a group of cross data is displayed in the data display part 400 of the data display screen 40, as depicted in FIG. 10. In the case that the sort instruction button 44 is selected, S25 is an example of a group sorting process. The group of the cable data is an example of a first group and the group of the cross data is an example of a second group. The group sorting is an example of a second order.

As depicted in FIG. 8 or FIG. 10, the data display part 400 displays the contents of the database with the cable data and the cross data sorted by the specified sorting method. The arrangement order of the cross data can be selected by the sort instruction buttons 43 and 44, allowing the user to create labels in an order that suits the user's purpose. Furthermore, since the sorting results are displayed in the data display part 400, the user can check the order of the generated cross data and labels to be printed by using the data display part 400. The data display screen 40 may be used to edit the database.

Furthermore, the print application 22 in this embodiment can accept operations to the unit cut button 45 when the cross data is created. When the operation to the unit cut button 45 is accepted (S31), the print application 22 stores the information of the database with the cut information (S32). The cut information is information about the cutting of the label after printing.

The label printer 3 in this embodiment is capable of performing full cut, which causes a sheet including a label paper and a release paper to be cut to separate front and rear labels, and half cut, in which only the label paper is cut and the release paper is not cut so that the front and rear labels are connected by the release paper. The half cut is an example of a process for separating one label from the other. The print application 22 can instruct the label printer 3 how to cut the label after printing by adding the cutting information to the label data and sending the label data and the cutting information to the label printer 3.

The unit cut is an instruction to cut by a unit, as depicted on the right side of FIG. 7 or on the right side of FIG. 9, by combining the half cut depicted by the dashed line with the full cut depicted by the solid line. Specifically, the unit cut in the pair sorting is a cut instruction that makes the half cut between the cable data and the cross data of the pair and the full cut between the preceding pair and the following pair, as depicted in FIG. 7. The unit cut in the group sorting is a cut instruction that makes the half cut between each cable data, the half cut between each cross data, and the full cut between the group of the cable data and the group of the cross data, as depicted in FIG. 9. The print application 22 may display the cut points for the two types of cuts on the data display screen 40 being displayed.

When the database creation is completed, the user operates the complete button 47 on the data display screen 40 being displayed, as depicted in FIG. 8 or FIG. 10 (S33).

When the complete button 47 is operated, the print application 22 terminates the display of the data display screen 40 and displays the label edit screen 30 depicted in FIG. 4 (S34). In this case, the print application 22 associates the database displayed on the data display screen 40 with the object 311 arranged in the label area 31 of the label edit screen 30. S34 includes an example of an associating process. The print application 22 then displays a print image in the label area 31 of the label edit screen 30 with the first data of the completed database written to the object 311.

Figure 11:
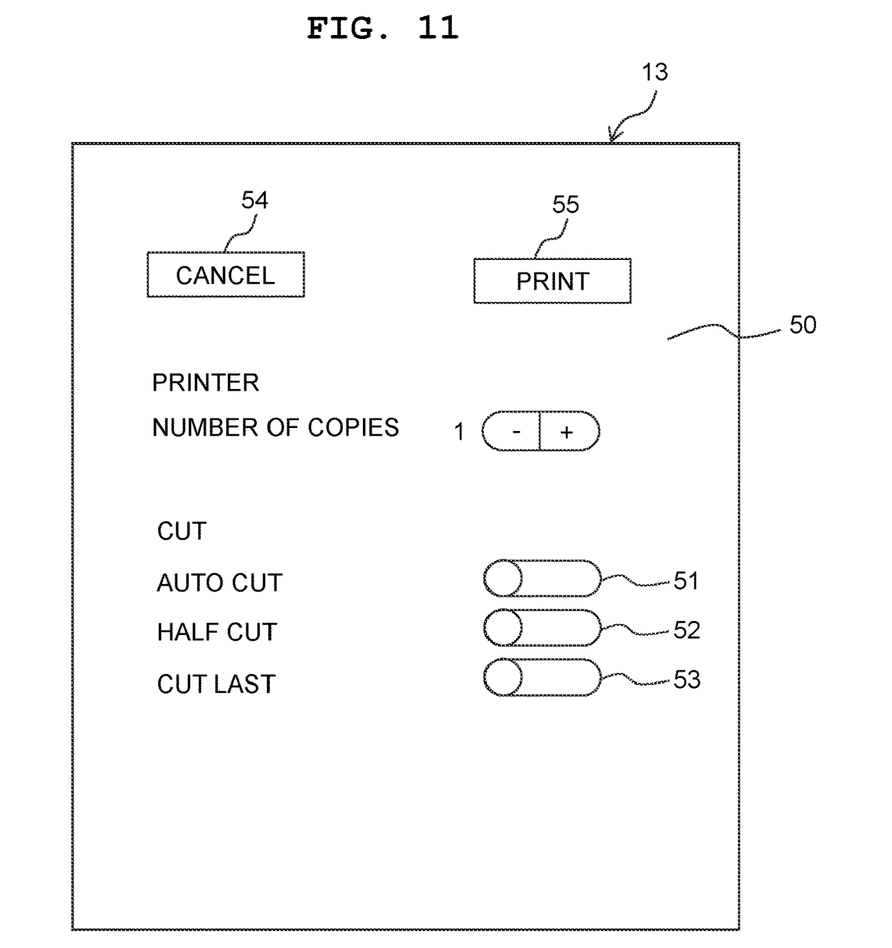
FIG. 11 depicts an example of a print screen.

The user instructs to execute printing by operating the print button 34 on the label edit screen 30 (S41). When the print button 34 is operated, the print application 22 displays the print screen 50 as depicted in FIG. 11 on the user IF 13 (S42). The print screen 50 is a screen for accepting a selection of a printer to execute the printing and the number of copies to print.

The print screen 50 includes, for example, cut instruction buttons 51 to 53 to accept cut selections, a cancel button 54, and a print button 55. The cut instruction button 51 accepts a cut instruction to cut both the label paper and the release paper for each label. The cut instruction button 52 accepts, for each label, a cut instruction to cut the label paper but not the release paper. The cut instruction button 53 accepts a cut instruction to cut only the back end of the last printed label, without cutting between labels.

If the print application 22 accepts an operation to one of the cut instruction buttons 51 to 53, the print application 22 gives priority to the instruction by operation to the one of the cut instruction buttons 51 to 53, even if the cut instruction information is stored in advance. For example, if the selection to the cut instruction button 51 is accepted, the print application 22 adds the cut information to the print instruction to cut all labels individually.

When the print button 55 is operated on the print screen 50 (S51), the print application 22 sends the print instruction, the label data, and the cut information to the label printer 3 based on the created database (S52). S52 is an example of a specific printing process. Specifically, the print application 22 creates label data with each text data stored in the created database written in the object 311, for each text data in the database in turn, and sends the label data to the label printer 3 in turn. The label printer 3 executes printing based on the received label data and creates the labels. If the cut information is added to the print instruction, the label printer 3 cuts the sheet based on the cut information after printing.

For example, when printing based on the database after pair sorting as indicated by the sort instruction button 43 is executed, a printout based on each cable data contained in the original cable DB 23 and a printout based on the cross data are created in succession, and the labels are created for all pairs. Since the labels are created for each pair, it becomes easier to attach the label to each cable, and the convenience of the database printing is further enhanced.

Furthermore, if the cut information for performing the full cut between pairs is added, the labels are cut for each pair. Therefore, the labels can be acquired in pairs, and errors in label use can be suppressed. Furthermore, if the cut information for performing the half cut between the labels within a pair is added, it is easy to separate labels in a pair after obtaining the labels in the pair, and it is easy to use each label.

For example, when a printing based on the database after the group sorting instructed by the sort instruction button 44 is executed, all printouts based on each cable data included in the original cable DB 23 are created, and then each printout based on each cross data is created after that. Since the labels are created in groups, it becomes easier to attach the labels separately to one end and the other end for multiple cables, and the convenience of the database printing is further enhanced.

Furthermore, if the cut information for performing the full cut between groups is added, the labels are cut for each group. Therefore, the labels can be acquired in groups and errors in the use of the labels can be suppressed. Furthermore, if the cut information for performing the half cut between labels in a group is added, it is easy to separate the labels in each group after obtaining the labels for each group, and it is easy to use each label.

After adding the copy data at S22, the print application 22 may accept the operation to the complete button 47 in the data display screen 40 (see FIG. 5) without accepting the instruction to create the cross data at S23. In that case, the print application 22 displays a database containing the cable data and the copy data, as depicted in FIG. 6, on the label edit screen 30 in FIG. 4. Furthermore, when the operation to the print button 34 is accepted on the label edit screen 30, the print application 22 displays the print screen 50 (see FIG. 11) with the database containing the cable data and the copy data as the print target, and can accept the instruction to execute printing. In other words, the print application 22 can also perform the database printing without creating the cross data.

Figure 12:
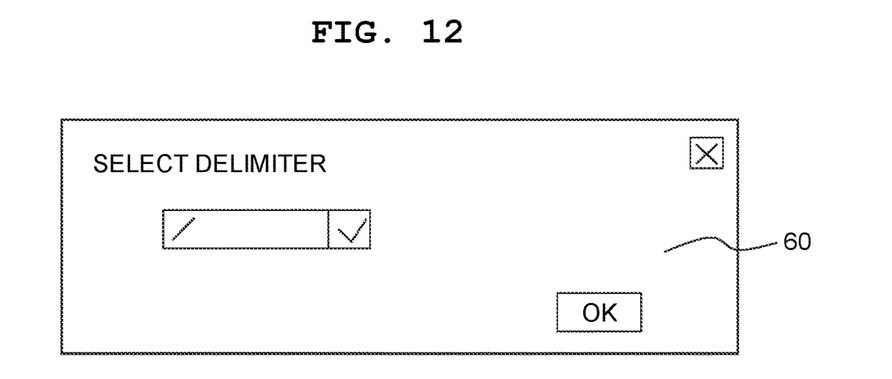
FIG. 12 depicts an example of a setting screen.

So far, the delimiter used by the print application 22 is predetermined and the user is required to create a database containing cable data using the delimiter, but the print application 22 may accept an instruction from the user to set the delimiter. For example, when the print application 22 accepts an operation to the cross data create button 42, the print application 22 may display a selection screen 60, as depicted in FIG. 12, to accept the user's selection from among a plurality of delimiters prepared in advance. The process of accepting the specification of the delimiter through the selection screen 60 is an example of a character setting process.

In this case, the print application 22 creates the cross data by using the character selected on the selection screen 60 as the delimiter and exchanging the character strings before and after the delimiter. By allowing the delimiter to be set, it is possible to create the labels that suit the user's application and preferences. The print application 22 may accept the setting of multiple characters as the delimiters.

The print application 22 may, for example, include information of the delimiter in the cable DB 23. If the information of the delimiter is included in the cable DB 23, the print application 22 may determine the delimiter based on the information in the cable DB 23.

As described above in detail, the print application 22 in this embodiment generates the copy data from the cable data contained in the cable DB 23 based on the acceptance of the operation to the cross data create button 42, and further generates the cross data by exchanging the character strings before and after the delimiter. When the print application 22 receives the print instruction, the print application is configured to generate the label data for each text data contained in the text data group of the cable data and the cross data, and to have the label printer 3 print the label data. Thus, from one cable data, the label of the cable data and the label of the cross data are created, and even if only one text data of the pair is prepared, a pair of labels can be obtained, increasing the convenience of database printing.

Furthermore, according to the print application 22 in this embodiment, for example, when printing labels to be attached to both ends of a cable, if a pair of labels with the front and back of the delimiters swapped at both ends are needed, the pair of labels can be easily created by using a database that contains only the cable data which is one of the pairs.

The present embodiment is merely illustrative and does not limit the present teaching in any way. Therefore, the present teaching can naturally be improved and transformed in various ways within the scope of not departing from the gist of the teaching. For example, the print media of the label printer is not limited to the rolled paper, but can also be a fanfold paper or a cut-sheet label paper.

The embodiment of each display screen illustrated in the accompanying drawings is not limited to the example depicted in the figure, but can be changed as necessary. For example, the placement and shape of each button is not limited to the examples depicted in the figures. The database after adding the cross data may be exportable, in which case the print application 22 may display a button to accept an export instruction.

In this embodiment, the cross data is created by performing the cross data create instruction (S23) after the copy data add instruction (S21). However, the print application 22 may accept these instructions together in a single operation. Specifically, the print application 22 may not display the copy data add button 41, but may make the cross data create button 42 operable once the database is designated, and may create and add cross data once the operation to the cross data create button 42 is accepted.

Although the procedure of creating the cross data from the copy data (S24) and then sorting the cable data and the cross data (S25) has been described in this embodiment, S25 and S24 may be executed in the reverse order. In other words, the print application 22 may perform the sorting with the copy data and then create the cross data.

In this embodiment, when the instruction to add copy data is accepted (S21), each copy data is added after each cable data. However, all copy data may be arranged after all cable data, the order of the cable data and the copy data may be reversed, or the user's selection of order may be accepted. When all cable data and all copy data are arranged separately, the order of the copy data may or may not match the order of the cable data.

In this embodiment, when the cross data create button 42 is turned on, the print application 22 makes the sort instruction button 43 selected state, as an initial state in S25. However, the print application 22 may make the sort instruction button 44 selected state, when the cross data create button 42 is turned on. The print application 22 may also accept a user's setting for a default sorting order.

The process for separating one label from the other is not limited to the half cut, but can also be, for example, perforating or printing cut lines.

In addition, in any flowchart disclosed in the embodiment, multiple processes in any number of steps can be arbitrarily changed in the order of execution or executed in parallel to the extent that there is no conflict in the content of the process.

The processes disclosed in the embodiment may be executed by a single CPU, multiple CPUs, hardware such as an ASIC, or a combination thereof. The processes disclosed in the embodiment may also be realized in various forms, such as a recording medium storing a program for executing the process, or a method.

What is claimed is:

1. A non-transitory medium storing a program executable by a computer of an information processing apparatus, the program, when executed by the computer, causing the computer to execute:
   a designating process for designating a database file including a plurality of text data;
   an associating process for associating the database file designated in the designating process with a text object; and
   a specific printing process for generating label data, for each of the text data included in the database file, with each of the text data written in the text object, and for causing a label printer to execute printing based on the label data generated,
   wherein based on a first operation, the program further causes the computer to execute:
      a duplicating process for duplicating first text data included in the database file to generate second text data; and
      an exchanging process, with respect to the second text data consisting of: a specific character; a first character string before the specific character; and a second character string after the specific character, for exchanging the first character string and the second character string each other, and
   wherein in a case that the second text data is generated in the duplicating process, the program further causes the computer, for each of the text data included in a text data group consisting of the first text data and the second text data, to generate the label data with the text data written in the text object and to cause the label printer to execute the printing based on the label data generated, in the specific printing process.

2. The medium according to claim 1, wherein
   the program causes the computer to execute a pair sorting process, for each of the text data included in the text data group consisting of the first text data and the second text data, for arranging pairs each consisting of one of the first text data and the second text data generated based on the first text data, and
   in the case that the second text data is generated in the duplicating process, the program causes the computer, for each of the text data included in the text data group, to generate the label data with the text data written in the text object in an arrangement order in the pair sorting process and to cause the label printer to execute the printing based on the label data generated, in the specific printing process.

3. The medium according to claim 2, wherein
   in the case that the second text data is generated in the duplicating process, the program causes the computer, for each of the text data included in the text data group, to generate the label data with the text data written in the text object in an arrangement order in the pair sorting process, and to cause the label printer to execute: the printing on a sheet based on the label data generated; and cutting of the sheet between printing based on a preceding pair and printing based on a succeeding pair, in the specific printing process.

4. The medium according to claim 3, wherein
   in the case that the second text data is generated in the duplicating process, the program causes the computer, for each of the text data included in the text data group, to generate the label data with the text data written in the text object in the arrangement order in the pair sorting process, and to cause the label printer to execute: the printing on the sheet based on the label data generated; the cutting of the sheet between the printing based on the preceding pair and the printing based on the succeeding pair; and a process for separating one label from the other label between the printing based on the first text data and the printing based on the second text data within each of the pairs, in the specific printing process.

5. The medium according to claim 1, wherein
   the program causes the computer to execute a group sorting process, for each of the text data included in the text data group consisting of the first text data and the second text data, for arranging a first group consisting of the first text data and a second group consisting of the second text data, and
   in the case that the second text data is generated in the duplicating process, the program causes the computer, for each of the text data included in the text data group, to generate the label data with the text data written in the text object in an arrangement order in the group sorting process and to cause the label printer to execute the printing based on the label data generated, in the specific printing process.

6. The medium according to claim 5, wherein
   in the case that the second text data is generated in the duplicating process, the program causes the computer, for each of the text data included in the text data group, to generate the label data with the text data written in the text object in the arrangement order in the group sorting process, and to cause the label printer to execute: the printing on a sheet based on the label data generated; and cutting of the sheet between printing based on a preceding group and printing based on a succeeding group, in the specific printing process.

7. The medium according to claim 6, wherein
   in the case that the second text data is generated in the duplicating process, the program causes the computer, for each of the text data included in the text data group, to generate the label data with the text data written in the text object in the arrangement order in the group sorting process, and to cause the label printer to execute: the printing on the sheet based on the label data generated; the cutting of the sheet between the printing based on the preceding group and the printing based on the succeeding group; and a process for separating one label from the other label between the printing based on preceding text data and the printing based on succeeding text data within each group, in the specific printing process.

8. The medium according to claim 5, wherein
   in the group sorting process, for each of the text data included in the text data group consisting of the first text data and the second text data, the program causes the computer to arrange a first group of the first text data and a second group of the second text data in the order of the first group and the second group, such that an order of the second text data in the second group coincides with an order of the first text data corresponding to the second text data in the first group.

9. The medium according to claim 1, wherein
   the program causes the computer to execute an order setting process for setting an order of the text data to one of a first order and a second order,
   for each of the text data included in the text data group consisting of the first text data and the second text data, the program causes the computer to execute a sorting process in which:

in a case of the first order being set in the order setting process, pairs each consisting of one of the first text data and the second text data based on the first text data are arranged; and in a case of the second order being set in the order setting process, a first group of the first text data and a second group of the second text data are arranged, and in the case that the second text data is generated in the duplicating process, the program causes the computer, for each of the text data included in the text data group, to generate the label data with the text data written in the text object in an arrangement order in the sorting process and to cause the label printer to execute the printing based on the label data generated, in the specific printing process.

10. The medium according to claim 1, wherein based on a second operation different from the first operation, the program causes the computer to execute the duplicating process to generate the second text data and not to execute the exchanging process for the second text data generated.

11. The medium according to claim 1, wherein the program causes the computer to further execute a character setting process for setting the specific character, and in the exchanging process, with respect to the second text data including the specific character set in the character setting process, the program causes the computer to exchange the first character string before the specific character and the second character string after the specific character each other.

12. The medium according to claim 1, wherein the program causes the computer to further execute a listing process for listing the first text data and the second text data which compose the text data group in a user interface of the information processing apparatus, after executing the exchanging process and before executing the specific printing process.

13. An information processing apparatus, comprising:

a user interface; and a computer, wherein the computer is configured to execute:

a designating process for designating a database file including a plurality of text data;

an associating process for associating the database file designated in the designating process with a text object; and a specific printing process for generating label data, for each of the text data included in the database file, with each of the text data written in the text object, and for causing a label printer to execute printing based on the label data generated, wherein in a case that the computer accepts a first operation via the user interface, the computer is configured to execute:

a duplicating process for duplicating first text data included in the database file to generate second text data; and an exchanging process, with respect to the second text data consisting of: a specific character; a first character string before the specific character; and a second character string after the specific character, for exchanging the first character string and the second character string each other, and wherein in a case that the second text data is generated in the duplicating process, for each of the text data included in a text data group consisting of the first text data and the second text data, the computer is configured to generate the label data with the text data written in the text object and to cause the label printer to execute the printing based on the label data generated, in the specific printing process.

* * * * *